US012767012B2

(12) United States Patent
Malaguti

(10) Patent No.: US 12,767,012 B2
(45) Date of Patent: Oct. 20, 2026

(54) VEHICLE SEAT AND ADJUSTING MECHANISM FOR VEHICLE SEAT

(71) Applicant: Bugatti Rimac LLC, Sveta Nedelja (HR)

(72) Inventor: Davide Malaguti, Samobor (HR)

(73) Assignee: Bugatti Rimac LLC, Sveta Nedelja (HR)

(*) Notice: Subject to any disclaimer, the term of this patent is extended or adjusted under 35 U.S.C. 154(b) by 174 days.

(21) Appl. No.: 18/748,773

(22) Filed: Jun. 20, 2024

(65) Prior Publication Data

US 2024/0416800 A1 Dec. 19, 2024

Related U.S. Application Data

(60) Provisional application No. 63/508,965, filed on Jun. 19, 2023.

(51) Int. Cl.
*B60N 2/06* (2006.01)
*B60N 2/90* (2018.01)

(52) U.S. Cl.
CPC ............... *B60N 2/06* (2013.01); *B60N 2/919* (2018.02)

(58) Field of Classification Search
CPC .......... B60N 2/06; B60N 2/10; B60N 2/2875; B60N 2/919
USPC ........................................................ 297/344.1
See application file for complete search history.

(56) References Cited

U.S. PATENT DOCUMENTS 8,029,062 B2 * 10/2011 Appelqvist ............ B60N 3/063 297/344.1
10,384,571 B2 * 8/2019 Lorey ...................... B60N 2/02
11,772,524 B2 * 10/2023 Roche ...................... B60N 2/06 297/344.1
2009/0100948 A1 * 4/2009 Ushiku .................. B60N 2/919 74/49
2010/0060061 A1 * 3/2010 Koga ................... B60N 2/1615 297/344.1
2016/0096458 A1 * 4/2016 Parker ...................... B60N 2/10 297/313
2016/0114703 A1 * 4/2016 Fujita ................... B60N 2/1615 248/550

(Continued)

FOREIGN PATENT DOCUMENTS

WO WO-0021779 A1 * 4/2000 ........... B60N 2/1835
WO WO-2014124630 A1 * 8/2014 ........... B60N 2/1615

*Primary Examiner* — Jose V Chen
(74) *Attorney, Agent, or Firm* — Dennemeyer & Associates LLC

(57) ABSTRACT

The present disclosure provides an adjusting mechanism. The adjusting mechanism comprises, a first geared member rotatably associated with the rear portion of the seat base, a second geared member rotatably associated with the rear portion of the seat base at a second geared member pivot point, and engaged with the first geared member, a driving member adapted to impart rotating movement to one of the first geared member and the second geared member, a link member having a first end portion pivotally connected to the base of the vehicle, and a second end portion pivotally connected to the second geared member, wherein rotation of the first geared member causes rotation of the second geared member about the second geared member pivot point and the tilting of the link member about each of the first end portion and the second end portion, whereby the seat base tilts about the front portion.

13 Claims, 6 Drawing Sheets

(56) References Cited

U.S. PATENT DOCUMENTS

| | | | | |
|---|---|---|---|---|
| 2016/0375800 | A1* | 12/2016 | Matsuyama | B60N 2/1853<br>297/344.1 |
| 2019/0308527 | A1* | 10/2019 | Nakamura | B60N 2/10 |
| 2020/0156504 | A1* | 5/2020 | Abdella | B60N 2/682 |
| 2021/0122266 | A1* | 4/2021 | Haller | B60N 2/1615 |
| 2022/0105835 | A1* | 4/2022 | Kim | B60N 2/1821 |
| 2022/0202189 | A1* | 6/2022 | Tsai | A47C 7/58 |
| 2022/0332224 | A1* | 10/2022 | Lee | B60N 2/2358 |
| 2024/0375558 | A1* | 11/2024 | Balin | B60N 2/02246 |

* cited by examiner

VEHICLE SEAT AND ADJUSTING MECHANISM FOR VEHICLE SEAT

CROSS-REFERENCE TO RELATED APPLICATION(S)

This application claims priority to U.S. Provisional Application No. 63/508,965, filed Jun. 19, 2023, the entire disclosure of which is incorporated herein by reference.

FIELD

The present invention pertains to the field of vehicles. In particular, the present invention relates to a seat of a vehicle.

BACKGROUND

Vehicles of various kinds are present almost everywhere in the world. The application area of a vehicle depends on the kind of vehicle and therefore the vehicles can be categorized as personal vehicles or commercial vehicles. Regardless of the classification or application area of the vehicle, the vehicles are provided with one or more seats. While some vehicles are provided with only front row of seats, other vehicles are provided with both front and rear row of seats.

Those traveling in the vehicle, whether it is the person driving the vehicle or not driving, occupy the seats, and therefore the seats are always designed to be comfortable for the occupants. In addition to being comfortable for the occupants, the seats are designed to be positioned within the vehicle in such a manner that other operable elements of the vehicle, such as steering, brake pedals etc., remain comfortably accessible to the occupants of the seats. Moreover, the seats are designed in such a manner that occupants have proper visibility to various display elements, and outside the vehicle, while also remaining in a proper position for the effectiveness of various restraint systems, such as airbags, or seatbelts.

The occupants of the seat may include individuals of different heights, weights, body types, or those with varying levels of physical comfort or requirement, or preferences. It is therefore also required from the seat that the occupant have an option of moving the seat as per their convenience or preference. The seats are therefore provided with various seat-moving mechanisms that allow seats to be tilted, lifted, or moved in various other ways and directions. Various seat-moving mechanisms are provided with the seats to allow such movement.

The hitherto existing seat-moving mechanisms typically tend to have limited versatility. For example, a vehicle can have space constraints arising, for example, from the presence of other components such as a battery pack in the rear side of the seat, or a vehicle can have space constraints disallowing movement of the seat in the front direction. These constraints make it difficult to employ conventional seat-moving mechanisms. Specifically, if the space constraint in the vehicle allows little movement of the seat to the front of the vehicle, the existing seat-moving mechanisms cease to be useful.

In addition to this, the hitherto existing seat-moving mechanisms tend to have a rather complex arrangement that is not only difficult to adapt, but also difficult to install or repair or operate or manufacture. Furthermore, the hitherto existing seat-moving mechanisms tend to utilize a multitude of linkages, and parts, and therefore occupy substantial space and are bulky. The presence of a multitude of linkages, and parts also poses reliability and stiffness-related issues with the existing seat-moving mechanisms.

In view of the above it is evident that there exists a need to facilitate movement of seat while satisfying constraints in the vehicle. There also exists a need for a seat that can be raised without considerable movement in forward direction. There also exists a need for a seat that can be raised by being tilted about a pivot point at its front end. There also exists a need for a mechanism for seat lifting that enables angular movement of the seat about a front pivot while being substantially less complex, employing fewer parts, and easy to adapt, install, repair, operate, or manufacture.

SUMMARY

In view of the foregoing disadvantages inherent in the prior art, the general purpose of the present invention is to provide a seat of a vehicle that includes all advantages of the prior art, while also overcoming the drawbacks inherent in the prior art.

Further, in view of the foregoing disadvantages inherent in the prior art, the general purpose of the present invention is to provide an adjusting mechanism for a seat that includes all advantages of the prior art, while also overcoming the drawbacks inherent in the prior art.

Advantageously, the seat of the present invention enables movement thereof while satisfying all the space constraints in the vehicle. Further, the present disclosure provides a seat that tilts about a pivot point at the front thereof, accordingly a possibility of axial forward movement of the seat is precluded. In addition, the present invention also provides an adjusting mechanism for a seat that enables pivotal movement of the seat about a front pivot. Further, the adjusting mechanism of the present invention, utilizes fewer links and is, therefore, more stiff, robust, and reliable. Furthermore, the adjusting mechanism of the present invention is compact, away from the front of the seat of the vehicle, and therefore provides various space and packaging-related advantages.

This together with the other aspects of the present invention, along with the various features of novelty that characterize the present invention, is pointed out with particularity in the claims annexed hereto and forms a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION

Figure 1:
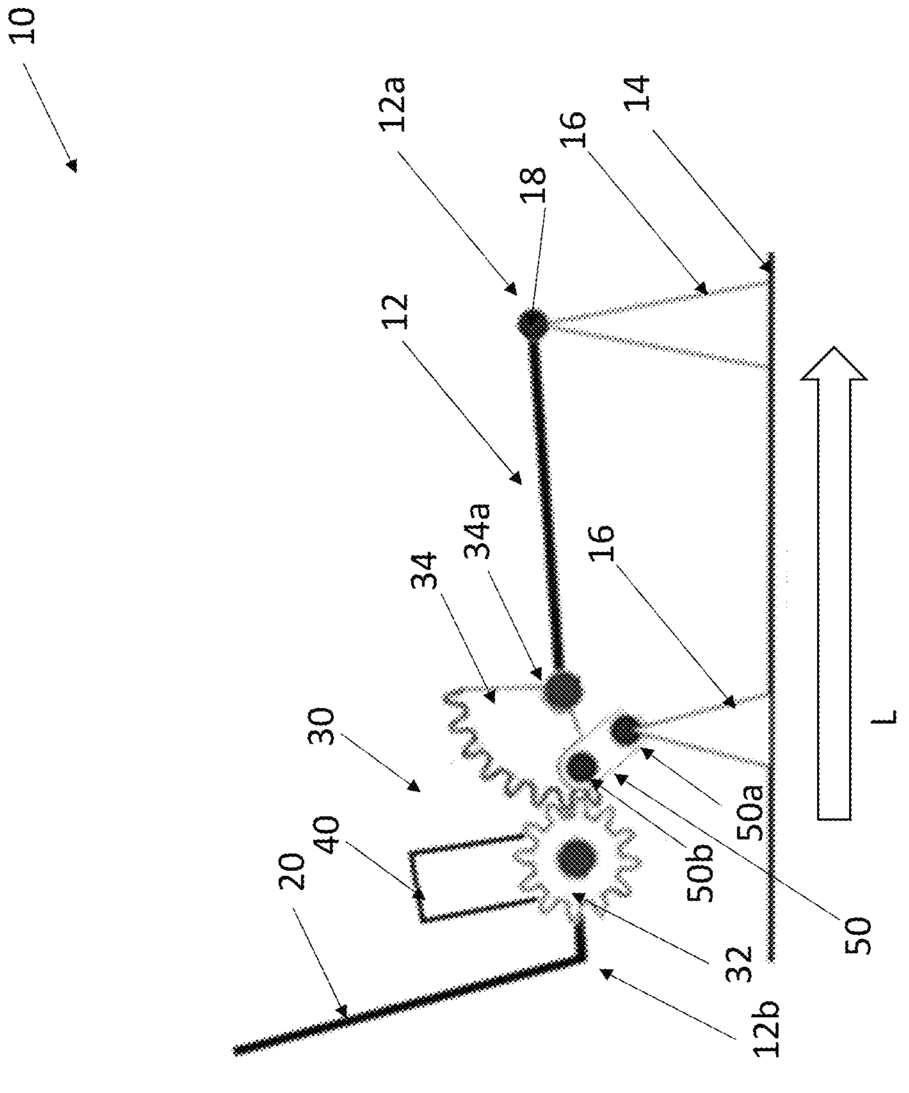
FIG. 1—shows a schematic view of a seat of a vehicle in a first position, according to an embodiment of the present invention.

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The terms, "a" and "an" herein do not denote a limitation of quantity, but rather denote the presence of at least one of the referenced item.

In the accompanying figures with the reference numeral 10 is indicated in general a seat, which could be advantageously implemented in a vehicle. It may, however, be noted that the seat 10 might find application in fields other than automotive, such as airplanes, work machines etc., without deviating from the spirit of the present invention. Further, the seat 10 may be a part of front row of seats or a rear row of seats.

The seat 10, as illustrated in FIG. 1, FIG. 2, FIG. 3, FIG. 4, FIG. 5, and FIG. 6, includes a seat base 12. The seat base 12 may include cushioning provided thereon, not illustrated. The seat base 12 includes a front portion 12*a* and a rear portion 12*b* opposite to the front portion 12*a* along length L of the vehicle.

The front portion 12*a* of the seat base 12 is pivotably fixed to a base 14 of the vehicle. In an example, the front portion 12*a* of the seat base 12 is pivotably fixed to the base 14 of the vehicle via one or more fixed brackets, such as bracket 16. The fixation of the front portion 12*a* of the seat base 12 about the base 14 of the vehicle ensures that linear movement of the seat base 12 along length L of the vehicle is restricted. More specifically, the pivotal connection of the front portion 12*a* of the seat base 12 to the base 14 of the vehicle via fixed bracket 16, allows angular movement of the seat base 12 about a front pivot point 18, while disallowing linear movement of the front portion 12*a* of the seat base 12 beyond the front pivot point 18. The front pivot point 18 is proximate to the front portion 12*a* of the seat base 12. For optimization, the pivot point is designed to be as low as possible.

The seat 10 further includes a seat back 20 connected to the seat base 12. Specifically, the seat back 20 is connected to the rear portion 12*b* of the seat base 12. In an example, the seat back 20 may be pivotally connected to the rear portion 12*b* of the seat base 12.

The seat 10 further includes an adjusting mechanism 30 associated with the rear portion 12*b* of the seat base 12. Specifically, the adjusting mechanism 30 is associated with the rear portion 12*b* of the seat base 12 and is positioned, and is accessible from, underneath the seat base 12.

Figure 2:
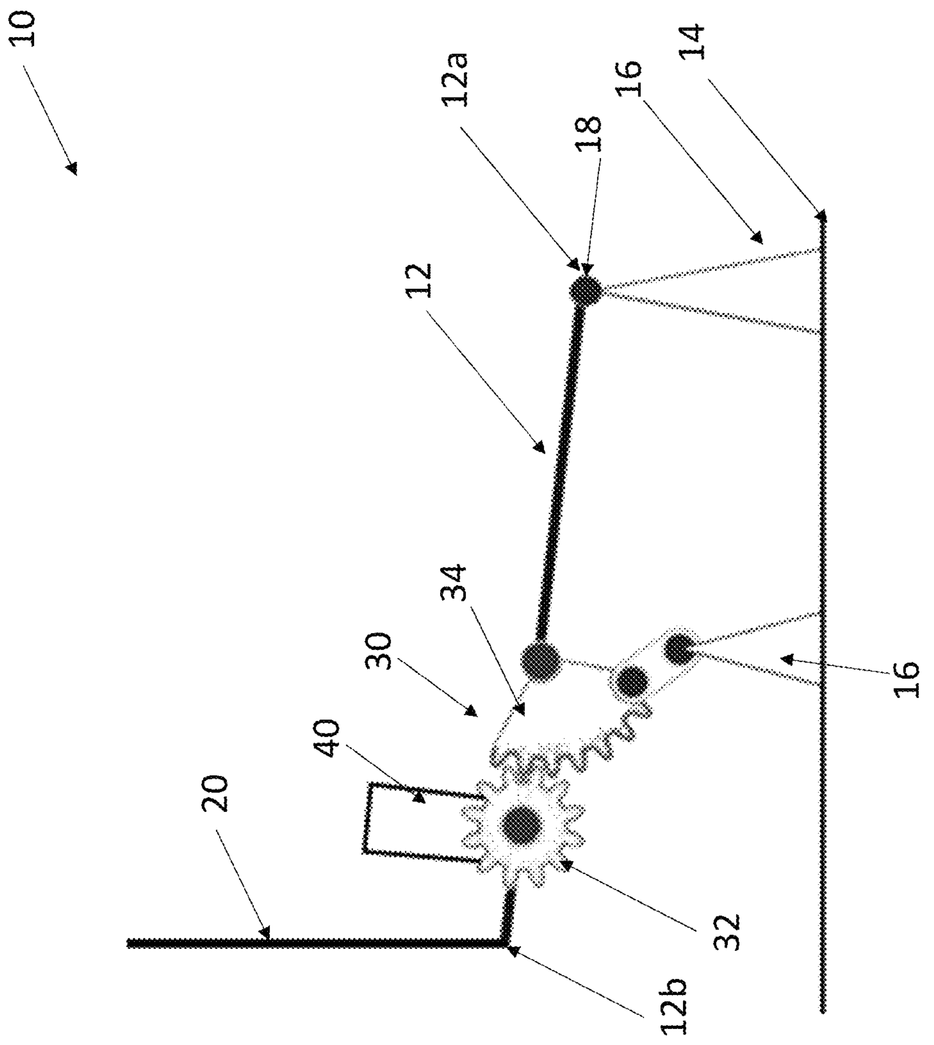
FIG. 2—shows a schematic view of the seat of the vehicle in a second position, according to an embodiment of the present invention.

Referring now to FIGS. 1, and 2, the adjusting mechanism 30 includes a first geared member 32 rotatably associated with the rear portion 12*b* of the seat base 12.

In an example, the first geared member 32 is a pinion gear. In other examples, the first geared member 32 may be cam member (not illustrated), or a segmented gear. The first geared member 32 is rotatably mounted along the seat base 12 at a point proximate to the rear portion 12*b* of the seat base 12.

The first geared member 32 is in geared meshing engagement with a second geared member 34. In other embodiments, the first geared member 32 may be in geared meshing engagement with the second geared member 34 via intermediate linkages or gears, not illustrated.

Adjacent to the first geared member 32, the second geared member 34 is also rotatably associated with the rear portion 12*b* of the seat base 12. Specifically, the second geared member 34 is rotatably associated with the rear portion 12*b* of the seat base 12 at a second geared member pivot point 34*a*. The second geared member 34 is adapted to move about the second geared member pivot point 34*a*, while being in engagement with the first geared member 32. In the same manner, the first geared member 32 is adapted to move while being in engagement with the second geared member 34, when the second geared member 34 moves about the second geared member pivot point 34*a*.

Either of the first geared member 32 and the second geared member 34, have a driving member 40 associated with them. The driving member 40 is adapted to impart rotating movement to one of the first geared member 32 and the second geared member 34. In the embodiment disclosed in FIGS. 1, and 2 the driving member 40 is adapted to impart rotating movement, in clockwise, or counterclockwise direction, to the first geared member 32. In an example, the driving member 40 may be a motor.

The adjusting mechanism 30 further includes a link member 50. The link member 50 includes a first end portion 50*a* pivotally connected to the base 14 of the vehicle, and a second end portion 50*b* pivotally connected to the second geared member 34. In an example, the first end portion 50*a* is pivotably fixed to the base 14 of the vehicle via one or more fixed brackets, such as bracket 16. In an example, the link member 50 is a straight, I shape link. However, in alternative examples, the link member 50 may have an L shape, T shape, or any other suitable shape, extending between the base 14 of the vehicle, and the second geared member 34.

The driving member 40 is adapted to move the first geared member 32 between a first position, shown in FIG. 1, and a second position, shown in FIG. 2. In the first position, the link member 50 has a first orientation with respect to the base 14 of the vehicle, and the second geared member. Further, in the second position, the link member 50 has a second orientation with respect to the to the base 14 of the vehicle, and the second geared member 34. In the first position of the first geared member 32, and the first orientation of the link member 50, the seat base 12 is at a first angle with respect to the base 14 of the vehicle. Whereas, in the second position of the first geared member 32 and the second orientation of the link member 50, the seat base 12 is at a second angle with respect to the base 14 of the vehicle. The first angle is smaller than the second angle. This may be done for optimization purposes, however, this can be a little different as well.

In other words, in the first angle, the rear portion 12*b* of the seat base 12 is at a first height with respect to the base 14 of the vehicle. Whereas, in the second angle the rear portion 12*b* of the seat base 12 is at a second height with respect to the base 14 of the vehicle. The first height is smaller than the second height. This may be done for optimization purposes, however this can be a little different as well.

In order to cause movement of the adjusting mechanism 30, rotation of the first geared member 32 causes rotation of the second geared member 34 (or vice versa) about the second geared member pivot point 34*a*. This movement causes the tilting of the link member 50 about each of the first end portion 50*a* and the second end portion 50*b*. This causes the seat base 12 to tilt about the front portion 12*a*. More specifically, clockwise movement of the first geared member 32 causes anticlockwise rotation of the second geared member 34 about the second geared member pivot point 34*a*. This movement causes the clockwise tilting of the link member 50 about the first end portion 50*a*. This causes the seat base 12 to tilt clockwise about the front portion 12*a*.

Figure 3:
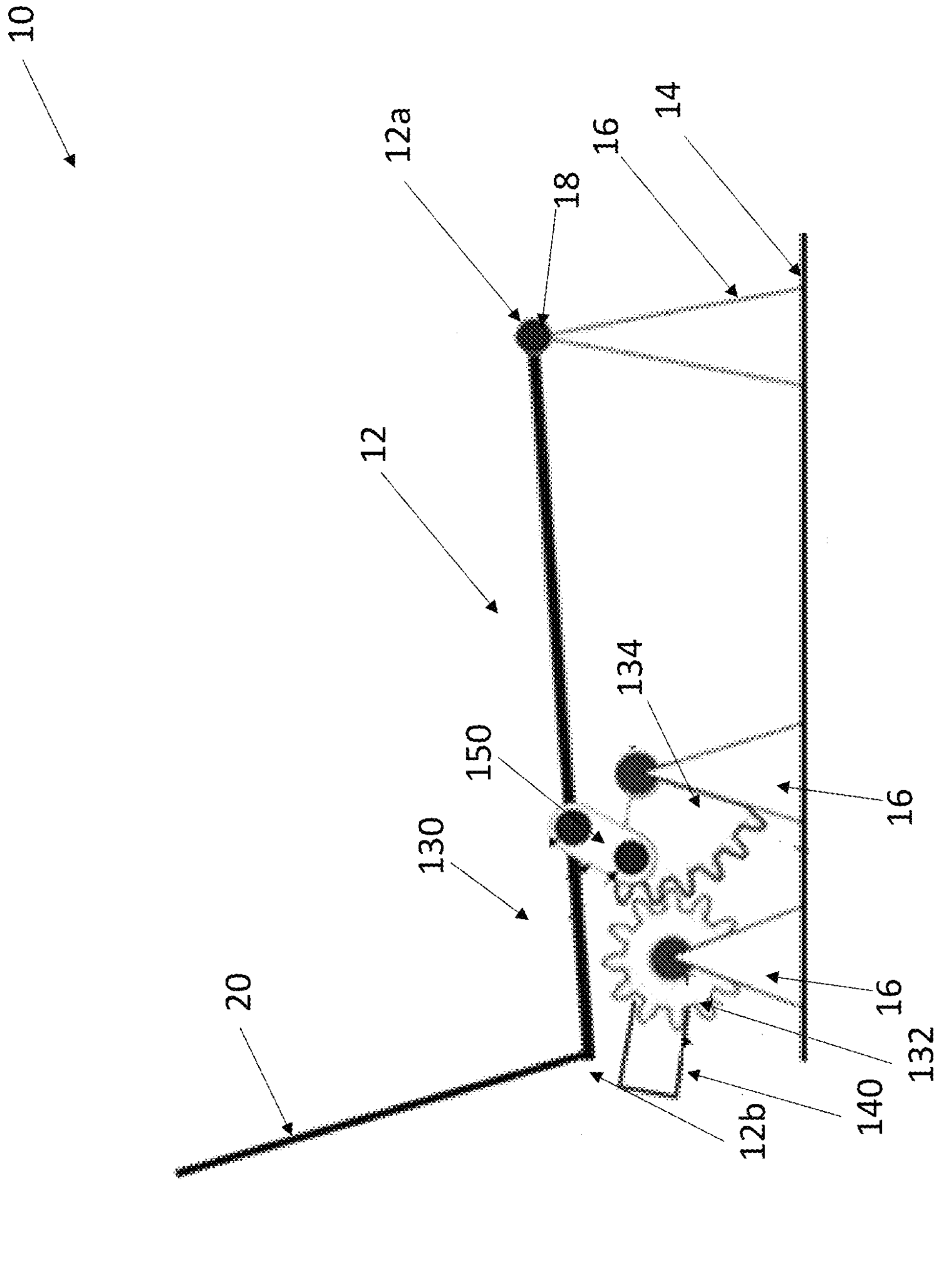
FIG. 3—shows a schematic view of the seat of the vehicle in a first position, according to another embodiment of the present invention.
Figure 4:
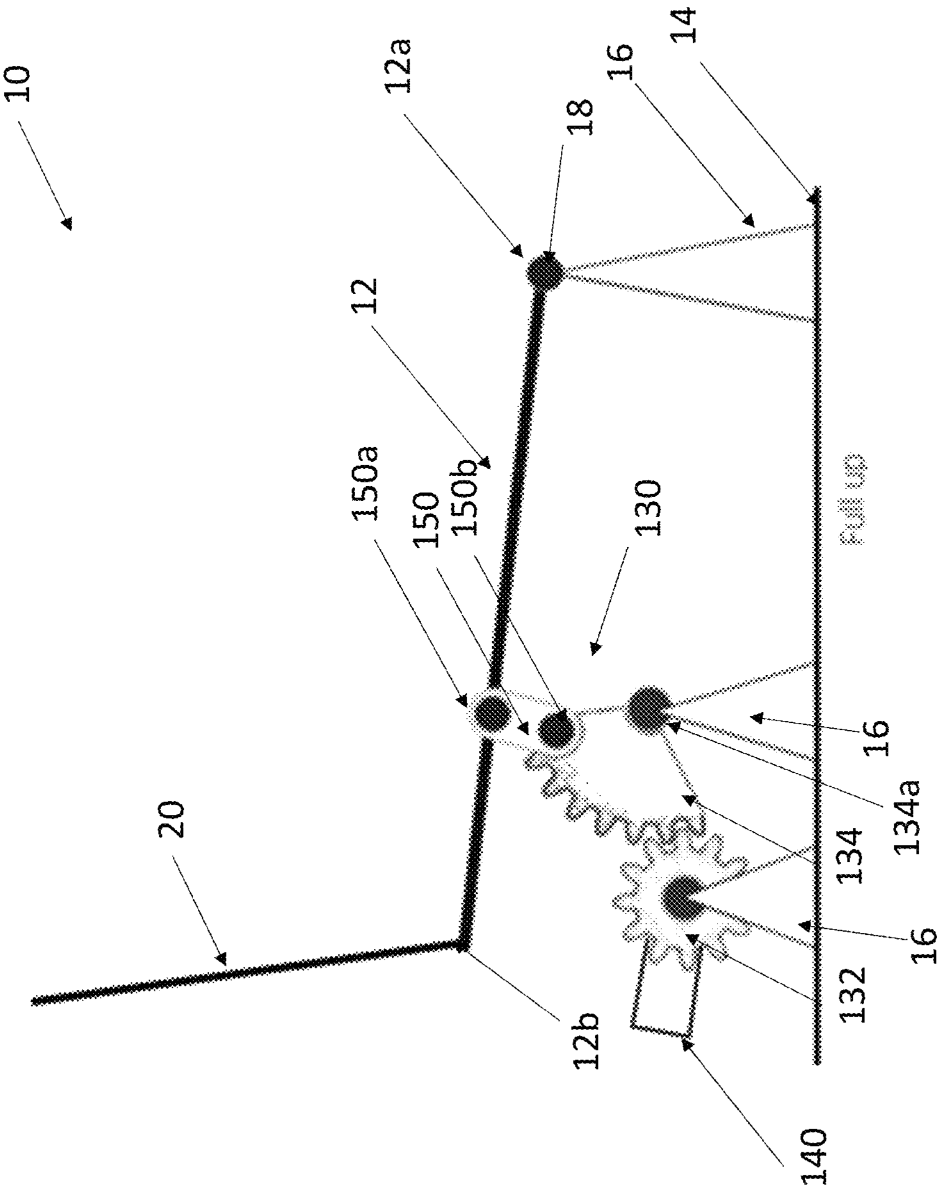
FIG. 4—shows a schematic view of the seat of the vehicle in a second position, according to another embodiment of the present invention.

Referring now to another embodiment of the present disclosure, illustrated in FIG. 3, and FIG. 4, the adjusting mechanism 130 includes a first geared member 132 rotatably associated with the base 14 of the vehicle proximate to the rear portion 12*b* of the seat base 12. In an example, the first geared member 132 is a pinion gear. In other examples, the first geared member 132 may be cam member (not illustrated), or a segmented gear. The first geared member 132 is fixed to the base 14 of the vehicle via one or more fixed brackets, such as bracket 16, at a point proximate to the rear portion 12*b* of the seat base 12.

Similar to the first geared member 32, the first geared member 132 is in geared meshing engagement with a second geared member 134. In other embodiments, the first geared member 132 may be in geared meshing engagement with the second geared member 134 via intermediate linkages or gears, not illustrated.

Adjacent to the first geared member 132, the second geared member 134 is also rotatably associated with the base 14 of the vehicle. Specifically, the second geared member 134 is rotatably associated with the base 14 of the vehicle via one or more fixed brackets, such as bracket 16, at a second geared member pivot point 134*a*.

The second geared member 134 is adapted to move about the second geared member pivot point 134*a*, while being in engagement with the first geared member 132. In the same manner, the first geared member 132 is adapted to move while being in engagement with the second geared member 134, when the second geared member 134 moves about the second geared member pivot point 134*a*.

Either of the first geared member 132 and the second geared member 134, have a driving member 140 associated with them. The driving member 140 is adapted to impart rotating movement to one of the first geared member 132 and the second geared member 134. In the embodiment disclosed in FIGS. 3, and 4 the driving member 140 is adapted to impart rotating movement, in clockwise, or counterclockwise direction, to the first geared member 132.

The adjusting mechanism 130 further includes a link member 150. The link member 150 includes a first end portion 150*a* pivotally connected to the rear portion 12*b* of the seat base 12, and a second end portion 150*b* pivotally connected to the second geared member 134. In an example, the link member 150 is a straight, I shape link. However, in alternative examples, the link member 50 may have an L shape, T shape, or any other suitable shape, extending between the rear portion 12*b* of the seat base 12, and the second geared member 134.

The driving member 140 is adapted to move the first geared member 132 between a first position, shown in FIG. 3, and a second position, shown in FIG. 4. In the first position, the link member 150 has a first orientation with respect to the second geared member. Further, in the second position, the link member 150 has a second orientation with respect to the second geared member 134. In the first position of the first geared member 132, and the first orientation of the link member 150, the seat base 12 is at a first angle with respect to the base 14 of the vehicle. Whereas, in the second position of the first geared member 132 and the second orientation of the link member 150, the seat base 12 is at a second angle with respect to the base 14 of the vehicle. The first angle is smaller than the second angle.

Figure 5:
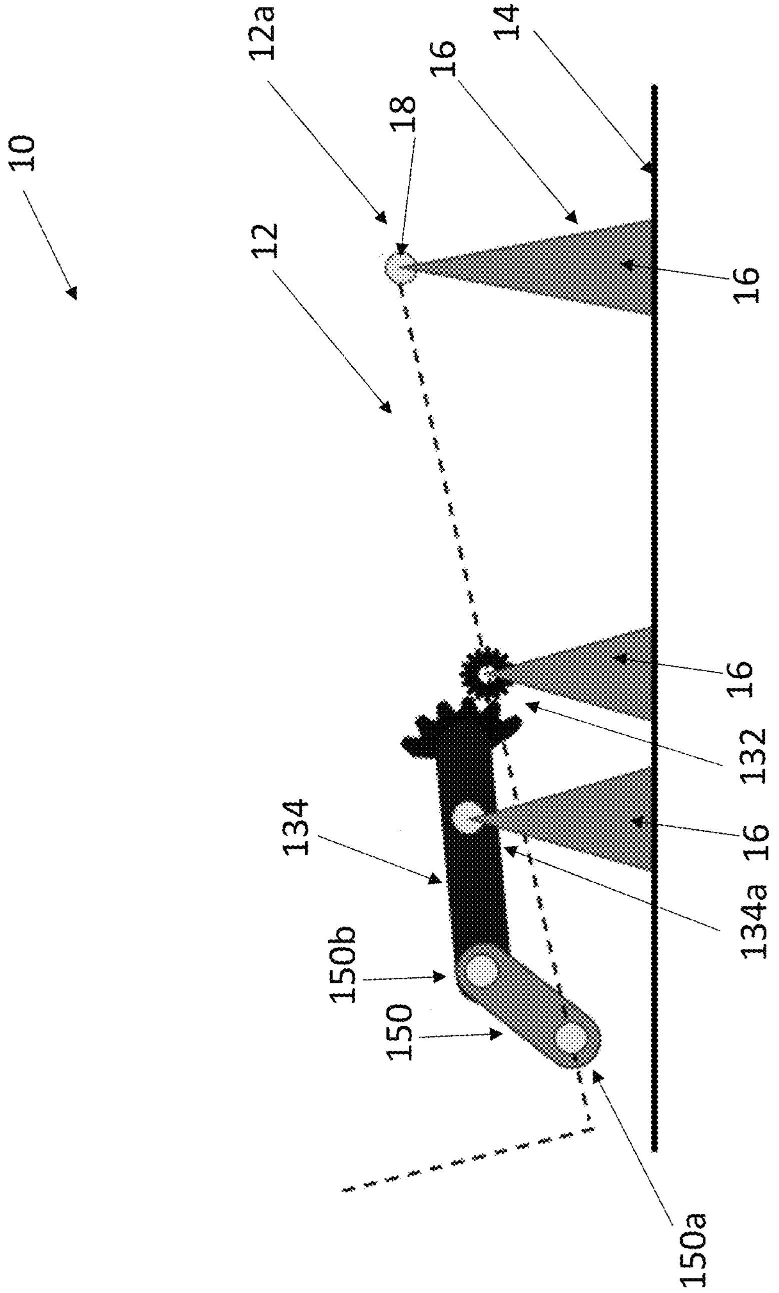
FIG. 5—shows a schematic view of the seat of the vehicle in a first position, according to another embodiment of the present invention.
Figure 6:
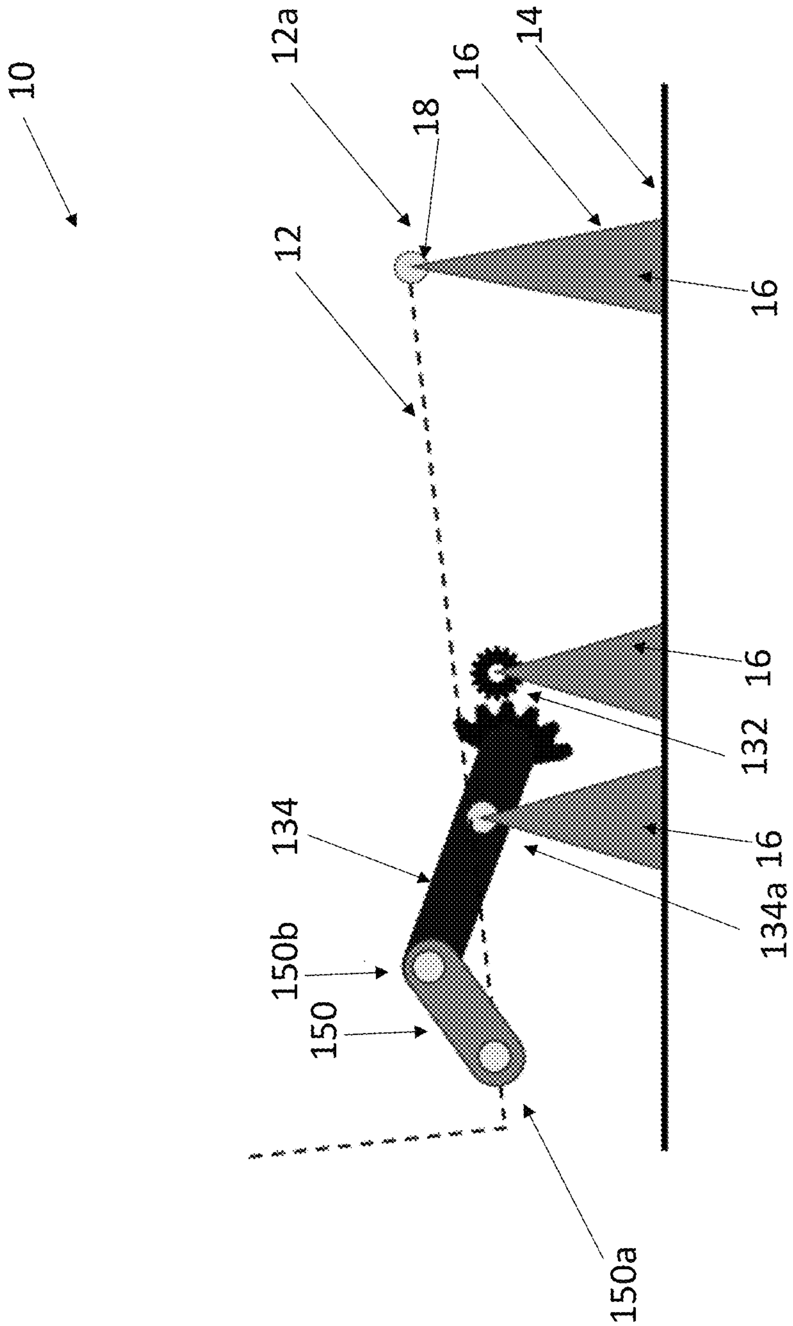
FIG. 6—shows a schematic view of the seat of the vehicle in a second position, according to another embodiment of the present invention.

Referring now to another embodiment of the present disclosure, illustrated in FIG. 5, and FIG. 6, the adjusting mechanism 130 includes a first geared member 132 rotatably associated with the base 14 of the vehicle, proximate to the rear portion 12*b* of the seat base 12. In an example, the first geared member 132 is a pinion gear mounted fixed to the base 14 of the vehicle via one or more fixed brackets, such as bracket 16.

The first geared member 132 is in geared meshing engagement with a second geared member 134. The second geared member 134 is also rotatably associated with the base 14 of the vehicle. Specifically, the second geared member 134 is rotatably associated with the base 14 of the vehicle via one or more fixed brackets, such as bracket 16, at a second geared member pivot point 134*a*.

The second geared member 134 is adapted to move about the second geared member pivot point 134*a*, while being in engagement with the first geared member 132. In the same manner, the first geared member 132 is adapted to move while being in engagement with the second geared member 134, when the second geared member 134 moves about the second geared member pivot point 134*a*.

Either of the first geared member 132 and the second geared member 134, have a driving member 140 associated with them. The driving member 140 is adapted to impart rotating movement to one of the first geared member 132 and the second geared member 134.

As illustrated, the second geared member 134 may be embodied as a segmented geared member 134*c* having an elongated arm 134*b*. The second geared member pivot point 134*a* may be defined on the elongated arm 134*b*. In an embodiment, the elongated arm 134*b* has a first end (not numbered) and the segmented geared member 134*c* at an end opposite to the first end.

The adjusting mechanism 130 further includes the link member 150. The link member 150 includes the first end portion 150*a* pivotally connected to the rear portion 12*b* of the seat base 12, and the second end portion 150*b* pivotally connected to the second geared member 134. Specifically, the first end portion 150*a* pivotally connected to the rear portion 12*b* of the seat base 12, whereas the second end portion 150*b* is pivotally connected to the first end of the elongated arm 134*b* of the second geared member 134.

The driving member 140 is adapted to move the first geared member 132 between a first position, shown in FIG.

5, and a second position, shown in FIG. 5. The rotation of the first geared member 132 causes rotation of the second geared member 134 about the second geared member pivot point 134*a*. The rotation of the second geared member 134 about the second geared member pivot point 134*a* causes tilting of the link member 150 about each of the first end portion 150*a* and the second end portion 150*b*, whereby the seat base 12 tilts about the front portion 12*a*. In the first position, the link member 150 has a first orientation with respect to the second geared member. Further, in the second position, the link member 150 has a second orientation with respect to the second geared member 134. In the first position of the first geared member 132, and the first orientation of the link member 150, the seat base 12 is at a first angle with respect to the base 14 of the vehicle. Whereas, in the second position of the first geared member 132 and the second orientation of the link member 150, the seat base 12 is at a second angle with respect to the base 14 of the vehicle. The first angle is smaller than the second angle.

The distance between the second geared member pivot point 134*a* and the first geared member 132 is longer than a distance between the second geared member pivot point 134*a* and the second end portion 150*b* of the link member 150.

In other words, in the first angle, the rear portion 12*b* of the seat base 12 is at a first height with respect to the base 14 of the vehicle. Whereas, in the second angle the rear portion 12*b* of the seat base 12 is at a second height with respect to the base 14 of the vehicle. The first height is smaller than the second height.

In order to cause movement of the adjusting mechanism 130, i.e., to change height of the seat from the first height to the second height, rotation of the first geared member 132 causes rotation of the second geared member 134 (or vice versa) about the second geared member pivot point 134*a*. This movement causes the tilting of the link member 150 about each of the first end portion 150*a* and the second end portion 150*b*. This causes the seat base 12 to tilt about the front portion 12*a*.

More specifically, clockwise movement of the first geared member 132 causes anticlockwise rotation of the second geared member 134 about the second geared member pivot point 134*a*. This movement causes the clockwise tilting of the link member 150 about the first end portion 150*a*. This causes the seat base 12 to tilt clockwise about the front portion 12*a*.

In light of the foregoing the present disclosure provides a seat and an adjusting mechanism of that seat that movement of the seat about front pivot point. By providing the adjusting mechanism at or proximate to the rear end of the seat, the seat of the present invention provides various space-saving and packaging advantages. In addition, by utilizing the first geared member and the second geared member, the seat of the present invention provides higher stiffness, and is more durable, and sturdy. Further, by utilizing fewer number of links, the present invention provides a more reliable mechanism for adjusting the seat. Moreover, by having the link member at the rear portion of the seat, the present invention facilitates height adjustment i.e., increase or decrease of seat height. That is to say that the seat of the present invention, because of the adjusting mechanism of the present invention is adapted to have a change in height only based on and because of the mechanism present in the rear thereof, and the front of the seat only tilts about only one pivot point, which throughout the movement of the seat remains stationary.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enabling others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A seat of a vehicle, the seat comprising:

a seat base having a front portion and a rear portion opposite to the front portion along a length of the vehicle, the front portion being pivotably fixed to a base of the vehicle; a seat back connected to the rear portion of the seat base; and an adjusting mechanism associated with the rear portion of the seat base, the adjusting mechanism comprising:

a first geared member rotatably associated with the base of the vehicle;

a second geared member rotatably associated with the base of the vehicle and engaged with the first geared member, the second geared member having a second geared member pivot point;

a driving member adapted to impart rotating movement to at least one of the first geared member and the second geared member; and a link member having a first end portion pivotally connected to the rear portion of the seat base, and a second end pivotally connected to the second geared member;

wherein rotation of the first geared member causes rotation of the second geared member about the second geared member pivot point and tilting of the link member about each of the first end portion and the second end portion, whereby the seat base tilts about the front portion.

2. The seat of the vehicle as claimed in claim 1, wherein the first geared member is a pm1on gear.

3. The seat of the vehicle as claimed in claim 2, wherein the second geared member is a segmented geared member having an elongated arm.

4. The seat of the vehicle as claimed in claim 3, wherein the second end of the link member is pivotally connected to the elongated arm of the second geared member.

5. The seat of the vehicle as claimed in claim 1, further comprising a front pivot point pivotably fixed with respect to the base of the vehicle, such that the seat base is adapted to move angularly about the front pivot point while linear movement of the front pivot point of the front portion of the seat base is restricted.

6. The seat of the vehicle as claimed in claim 5 wherein the driving member is adapted to move the first geared member between a first position, and a second position, wherein in the first position of the first geared member the link member has a first orientation with respect to the base of the vehicle and the second geared member, and in the second position of the first geared member the link member has a second orientation with respect to the base of the vehicle and the second geared member, wherein in the first position of the first geared member, and the first orientation of the link member, the seat base is at a first angle with respect to the base of the vehicle, and in the second position of the first geared member and the second orientation of the link member the seat base is at a second angle with respect to the base of the vehicle.

7. The seat of the vehicle as claimed in claim 6, wherein the first angle is smaller than the second angle.

8. The seat of the vehicle as claimed in claim 7, wherein in the first angle the rear portion of the seat base is at a first height with respect to the base of the vehicle, and in the second angle the rear portion of the seat base is at a second height with respect to the base of the vehicle, wherein the first height is smaller than the second height.

9. The seat of the vehicle as claimed in claim 1, wherein the seat base includes a front pivot point proximate to the front portion thereof.

10. The seat of the vehicle as claimed in claim 1, wherein a distance between the second geared member pivot point and the first geared member is longer than a distance between the second geared member pivot point and the second end of the link member.

11. The seat of the vehicle as claimed in claim 10 further comprising a rear constraint positioned behind the seat back.

12. An adjusting mechanism of a seat, the adjusting mechanism comprising:

a first geared member configured to be rotatably associated with a base of a vehicle proximate to a rear portion of a seat base;

a second geared member configured to be rotatably associated with a base of a vehicle proximate to the rear portion of the seat base at a second geared member pivot point, and engaged with the first geared member;

a driving member adapted to move at least one of the first geared member and the second geared member between a first position and a second position; and a link member having a first end portion pivotally connected to the rear portion of the seat base, and a second end pivotally connected to the second geared member;

wherein rotation of the first geared member causes rotation of the second geared member about the second geared member pivot point and tilting of the link member about each of the first end portion and the second end portion, whereby the seat base tilts about a front portion of the seat base.

13. A seat of a vehicle, the seat comprising:

a seat base having a front portion and a rear portion opposite to the front portion along a length of the vehicle, the front portion being pivotably fixed to a base of the vehicle;

a seat back connected to the rear portion of the seat base;

an adjusting mechanism associated with the rear portion of the seat base, the adjusting mechanism comprises:

a first geared member rotatably associated with the rear portion of the seat base;

a second geared member rotatably associated with the rear portion of the seat base at a second geared member pivot point, and engaged with the first geared member;

a driving member adapted to impart rotating movement to one of the first geared member and the second geared member; and a link member having a first end portion pivotally connected to the base of the vehicle, and a second end portion pivotally connected to the second geared member;

wherein rotation of the first geared member causes rotation of the second geared member about the second geared member pivot point and tilting of the link member about each of the first end portion and the second end portion, whereby the seat base tilts about the front portion.

* * * * *